(12) United States Patent
Stratton et al.

(10) Patent No.: US 9,097,520 B2
(45) Date of Patent: Aug. 4, 2015

(54) SYSTEM AND METHOD FOR MAPPING A RAISED CONTOUR

(71) Applicant: Caterpillar Inc., Peoria, IL (US)

(72) Inventors: Kenneth L. Stratton, Dunlap, IL (US); Andrew J. Vitale, Peoria, IL (US); Craig L. Koehrsen, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 98 days.

(21) Appl. No.: 13/916,122

(22) Filed: Jun. 12, 2013

(65) Prior Publication Data

US 2014/0371947 A1  Dec. 18, 2014

(51) Int. Cl.
*G01C 7/04* (2006.01)

(52) U.S. Cl.
CPC .......................................... *G01C 7/04* (2013.01)

(58) Field of Classification Search
CPC  B60G 17/0195; B60R 16/0231; B60T 8/172; G01C 21/20; G01C 21/26; G01C 21/32; G01C 21/34; G01C 21/3682
USPC ......... 701/1, 50, 56, 409, 446, 450, 454–455, 701/461–462
See application file for complete search history.

(56) References Cited

U.S. PATENT DOCUMENTS

| | | | |
|---|---|---|---|
| 5,436,839 A | 7/1995 | Dausch et al. | |
| 5,531,122 A | 7/1996 | Chatham et al. | |
| 5,646,844 A | 7/1997 | Gudat et al. | |
| 5,736,939 A | 4/1998 | Corcoran | |
| 5,913,914 A | 6/1999 | Kemner et al. | |
| 5,931,875 A | 8/1999 | Kemner et al. | |
| 5,953,098 A | 9/1999 | Lieberman et al. | |
| 5,956,250 A | 9/1999 | Gudat et al. | |
| 5,968,103 A | 10/1999 | Rocke | |
| 6,064,926 A | 5/2000 | Sarangapani et al. | |
| 6,161,071 A | 12/2000 | Shuman et al. | |
| 6,173,215 B1 | 1/2001 | Sarangapani | |
| 6,236,039 B1 | 5/2001 | Lee | |
| 6,313,758 B1 | 11/2001 | Kobayashi | |
| 6,336,051 B1 | 1/2002 | Pangels et al. | |
| 6,442,456 B2 | 8/2002 | Burns et al. | |
| 6,445,983 B1 | 9/2002 | Dickson et al. | |
| 6,470,271 B2 | 10/2002 | Matsunaga | |
| 6,484,089 B1 | 11/2002 | Millington | |
| 6,493,612 B1 | 12/2002 | Bisset et al. | |
| 6,502,016 B1 | 12/2002 | Ozaki et al. | |
| 6,608,913 B1 | 8/2003 | Hinton et al. | |
| 6,636,807 B1 | 10/2003 | Glasmacher et al. | |
| 6,668,157 B1 | 12/2003 | Takeda et al. | |

(Continued)

FOREIGN PATENT DOCUMENTS

EP  0875751 A1  11/1998
JP  2000-137522 A  5/2000

*Primary Examiner* — James Trammell
*Assistant Examiner* — Atul Trivedi
(74) *Attorney, Agent, or Firm* — Leydig, Voit & Mayer, Ltd.

(57) ABSTRACT

A system includes a position sensing system for determining a position of a machine and a work implement configured to engage material to form a raised contour. A controller determines a plurality of positions of the machine as the machine moves about the work site and the work implement forms the raised contour, determines a plurality of reference positions along an edge of the raised contour as the work implement forms the raised contour, and generates a map of the edge of the raised contour based upon the plurality of reference positions.

16 Claims, 7 Drawing Sheets

(56) References Cited

U.S. PATENT DOCUMENTS

| | | |
|---|---|---|
| 6,711,838 B2 | 3/2004 | Staub et al. |
| 6,728,608 B2 | 4/2004 | Ollis et al. |
| 6,732,024 B2 | 5/2004 | Wilhelm Rekow et al. |
| 6,845,311 B1 | 1/2005 | Stratton et al. |
| 6,895,310 B1 | 5/2005 | Kolls |
| 6,984,952 B2 | 1/2006 | Peless et al. |
| 6,996,462 B2 | 2/2006 | Heilmann et al. |
| 6,996,464 B2 | 2/2006 | Sorrells |
| 7,272,474 B1 | 9/2007 | Stentz et al. |
| 7,734,397 B2 | 6/2010 | Peterson et al. |
| 7,881,497 B2 | 2/2011 | Ganguli et al. |
| 7,966,106 B2 | 6/2011 | Sudou et al. |
| 8,060,299 B2 * | 11/2011 | Gharsalli et al. ............... 701/425 |
| 8,140,239 B2 | 3/2012 | Stratton et al. |
| 8,688,332 B2 * | 4/2014 | Reiners et al. ................. 701/50 |
| 2002/0049530 A1 | 4/2002 | Poropat |
| 2003/0040849 A1 | 2/2003 | Hathout et al. |
| 2003/0111892 A1 | 6/2003 | Neilson et al. |
| 2003/0114980 A1 | 6/2003 | Klausner et al. |
| 2004/0107042 A1 | 6/2004 | Seick |
| 2004/0122580 A1 | 6/2004 | Sorrells |
| 2005/0024492 A1 | 2/2005 | Schaefer et al. |
| 2005/0075760 A1 | 4/2005 | Moisel et al. |
| 2006/0025897 A1 | 2/2006 | Shostak et al. |
| 2006/0089766 A1 | 4/2006 | Allard et al. |
| 2006/0149425 A1 | 7/2006 | Davis |
| 2007/0040705 A1 | 2/2007 | Yoshioka et al. |
| 2008/0027590 A1 | 1/2008 | Phillips et al. |
| 2008/0065290 A1 | 3/2008 | Breed et al. |
| 2008/0208416 A1 * | 8/2008 | Yuet et al. ....................... 701/50 |
| 2009/0043462 A1 * | 2/2009 | Stratton et al. .................. 701/50 |
| 2009/0202109 A1 * | 8/2009 | Clar et al. ...................... 382/104 |
| 2009/0216410 A1 | 8/2009 | Allen et al. |
| 2010/0004838 A1 | 1/2010 | Georgis et al. |
| 2010/0010703 A1 * | 1/2010 | Coats et al. ..................... 701/32 |
| 2010/0106344 A1 | 4/2010 | Edwards et al. |
| 2011/0153208 A1 * | 6/2011 | Kruglick ........................ 701/209 |
| 2012/0085458 A1 * | 4/2012 | Wenzel .......................... 141/10 |
| 2012/0087771 A1 * | 4/2012 | Wenzel .......................... 414/808 |
| 2012/0136523 A1 | 5/2012 | Everett et al. |
| 2013/0006482 A1 * | 1/2013 | Hukkeri et al. ................. 701/50 |
| 2014/0236477 A1 * | 8/2014 | Chen et al. ..................... 701/450 |
| 2014/0324291 A1 * | 10/2014 | Jones et al. ..................... 701/41 |

* cited by examiner

SYSTEM AND METHOD FOR MAPPING A RAISED CONTOUR

TECHNICAL FIELD

This disclosure relates generally to mapping a raised contour, and more particularly, to a system and method for determining an electronic map of a raised contour while forming the raised contour.

BACKGROUND

Mobile machines such as haul machines are often used to haul material from a load location at which material is loaded into the machines to a dump location at which the material is dumped or discharged from the machines. When operating near a crest or high wall, raised contours such as one or more berms are often formed adjacent the high wall to act as a guide and, to some extent a stop, to assist in positioning the haul machines adjacent the high wall during a dumping operation. More specifically, the berms may include a sloped wall that is engaged by the tires of the haul machines to assist in positioning the haul machine for the dumping operations.

The berms may be formed by the work implement or blade of a mobile material moving machine such as a dozer. When forming the berm, an operator may utilize multiple material moving operations to position material a desired distance from the high wall. The operator may further manipulate the blade of the dozer multiple times and in a variety of manners to shape the material as desired to form the berm.

Once the berm is formed in the desired shape and position, it may be desirable to determine the position of the berm and generate an electronic map of the berm. In one example, a machine having a mapping system may be driven by an operator along the berm to capture data indicative of the position of the berm. In another example, such a machine having a mapping system may operate autonomously and follow the berm to generate the desired position data. In either case, the position data may then be used to generate an electronic map of the berm. The electronic map of the berm may be used to guide haul machines that are being operated autonomously at the work site or the electronic map may be displayed to operators of haul machines that are being operated manually or semi-autonomously at the work site.

One example of a terrain mapping system is described in U.S. Pat. No. 6,608,913. The '913 patent describes a self-contained mapping and positioning system for use in underground mining applications. More specifically, a survey system includes a laser scanner attached to an underground, remotely-operated mining vehicle. As the vehicle advances through the mine, the scanner scans the mine. The scanned data is converted into point cloud data representing the surface of the mine. The survey system then stores the point cloud data in a three-dimensional database, which is used to navigate the vehicle through the mine.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for use with a machine for generating a map of an edge of a raised contour at a work site includes a position sensing system associated with the machine for determining a position of the machine, a work implement associated with the machine and configured to engage material at the work site to form the raised contour, and a controller. The controller is configured to determine a plurality of positions of the machine based upon the position sensing system as the machine moves about the work site and the work implement forms the raised contour, determine a plurality of reference positions along the edge of the raised contour based upon positions of the machine as the work implement forms the raised contour, and generate a map of the edge of the raised contour based upon the plurality of reference positions.

In another aspect, a machine includes a frame, a prime mover associated with the frame, a position sensing system associated with the machine for determining a position of the machine, a work implement configured to engage material at a work site to form a raised contour at the work site, and a controller. The controller is configured to determine a plurality of positions of the machine based upon the position sensing system as the machine moves about the work site and the work implement forms the raised contour, determine a plurality of reference positions along the edge of the raised contour based upon positions of the machine as the work implement forms the raised contour, and generate a map of the edge of the raised contour based upon the plurality of reference positions.

In still another aspect, a method for generating a map of an edge of a raised contour at a work site includes forming the raised contour with a work implement associated with a machine and determining a plurality of positions of the machine based upon the position sensing system as the machine moves about the work site and the work implement forms the raised contour. The method further includes determining a plurality of reference positions along the edge of the raised contour based upon the plurality of positions of the machine as the work implement forms the raised contour and generating a map of the edge of the raised contour based upon the plurality of reference positions.

DETAILED DESCRIPTION

Figure 1:
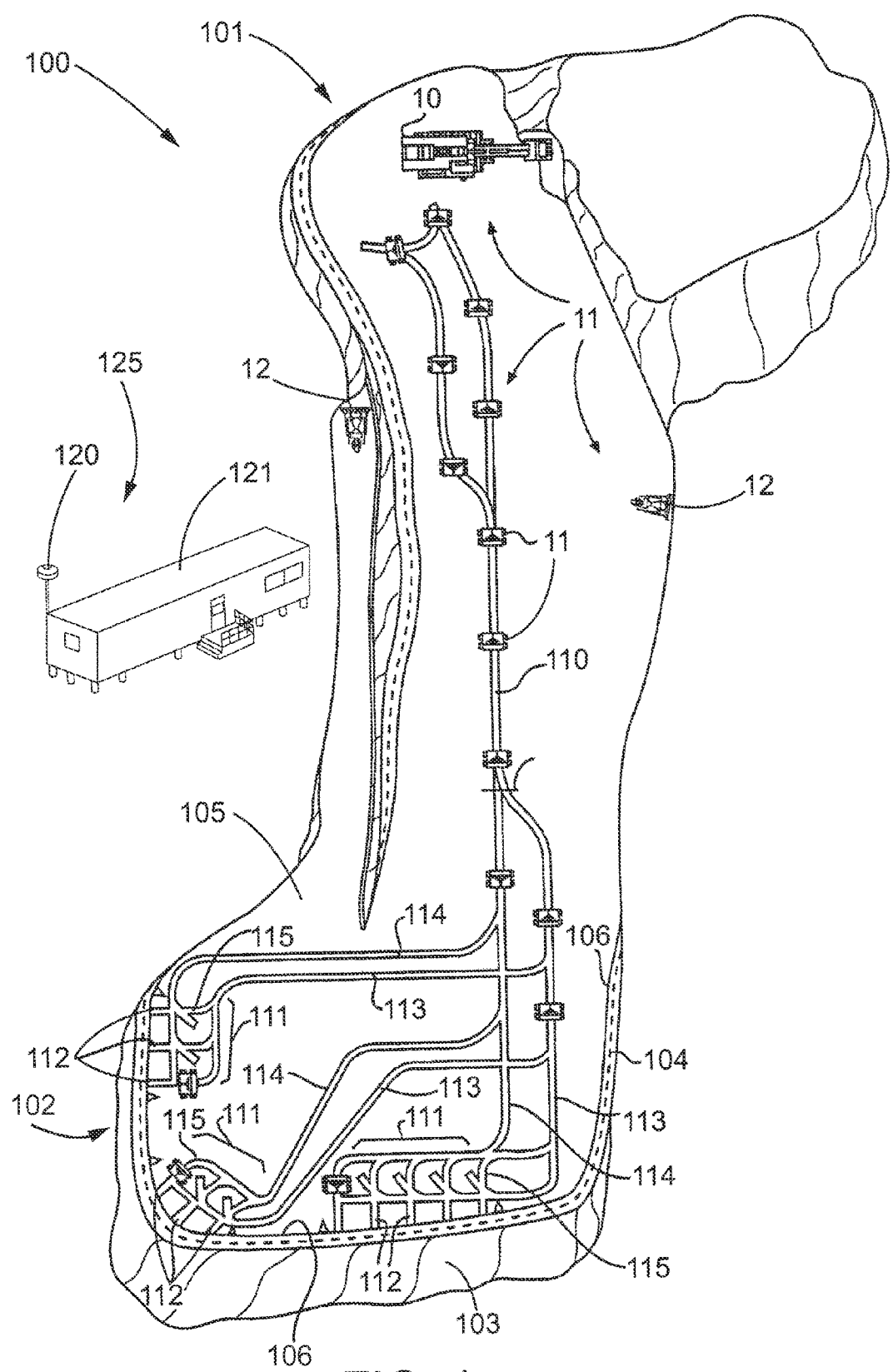
FIG. 1 is a schematic view of an exemplary work site at which a machine incorporating the principles disclosed herein may be used.

FIG. 1 depicts a diagrammatic illustration of an exemplary work site 100 at which one or more machines may operate in an autonomous, a semi-autonomous, or a manual manner. Work site 100 may be a portion of a mining site, a landfill, a quarry, a construction site, or any other type of work site. Tasks associated with the work site 100 may include a dozing operation, a grading operation, a dumping operation, a bulk material removal operation, or any other type of operation that results in the alteration of the current topography at work site 100.

Work site 100 may include multiple locations designated for particular purposes. For example, a first location may be designated as a load location 101, at which a mobile loading machine such as an excavator 10 or other resource operates to fill one or more mobile haul machines 11 with material. A second location may be designated as a dump location 102, at which haul machines 11 discharge their payloads. In the disclosed embodiment, the dump location 102 is positioned at an edge of a steep incline, crest, or cliff area often referred to as a high wall 103. In this embodiment, haul machines 11 may operate to discharge their payloads over the edge of the high wall 103. Haul machines 11 may follow a main travel path 110 that generally extends between load location 101 and dump location 102. Mobile material moving machines such as a dozer 12 may operate at the dump location 102 to establish and maintain the dump location by moving material such as by forming and maintaining a raised contour of material such as a berm 104 that extends upward from work surface 105 adjacent the high wall 103.

Dump location 102 may be divided into groupings 111 of dump targets 112 at which haul machines 11 may discharge their payloads. Each grouping 111 may be assigned an entrance path 113 and an exit path 114 that connect with main travel path 110, and individual travel lanes 115 that extend between each dump target 112 and opposing second ends of the corresponding entrance path 113 and exit path 114. It is contemplated that dump location 102 may have any number of groupings 111. By having multiple groupings 111 at dump location 102, more than one haul machine 11 may operate at dump location 102 at the same time without traffic problems and significant time delays along entrance paths 113 and exit paths 114.

The machines operating at the work site 100 may be self-directed machines configured to autonomously operate at the work site, manually operated machines configured to be operated under the control of an operator, or semi-autonomous machines configured to perform some operations autonomously and other functions under the control of an operator. As used herein, a machine operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a haul truck that automatically follows a path from one location to another but relies upon an operator command to dump a load may be operating semi-autonomously. In another example of a semi-autonomous operation, an operator may dump a bucket from an excavator into a haul truck and a dozer controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
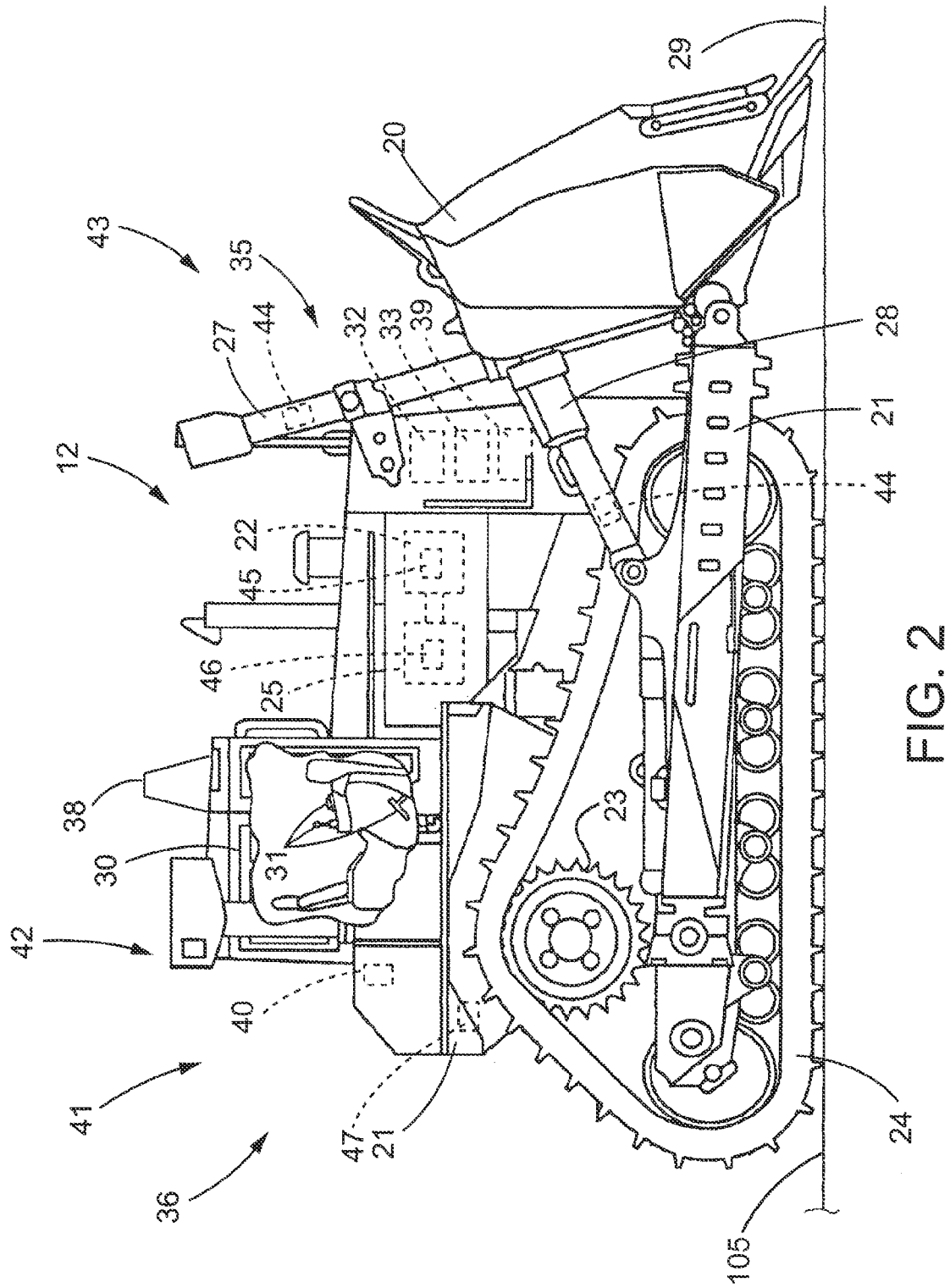
FIG. 2 is a diagrammatic illustration of a dozer in accordance with the disclosure.

FIG. 2 shows a diagrammatic illustration of a mobile material moving machine such as dozer 12 with a work implement or blade 20 configured to engage or push material at the work site 100. The dozer 12 includes a frame 21 and a prime mover such as an engine 22. A ground-engaging drive mechanism such as a track 24 may be driven by a drive wheel 23 on each side of dozer 12 to propel the machine. Although dozer 12 is shown in a "track-type" configuration, other configurations, such as a wheeled configuration, may be used.

Dozer 12 may be configured with a type of mechanical drive system so that engine 22 drives a torque converter 25 which in turn drives a transmission (not shown). The transmission may be operatively connected to the drive wheels 23 and the tracks 24. Operation of the engine 22 and transmission, and thus the drive wheels 23 and tracks 24, may be controlled by a dozer control system 40 including an onboard dozer controller such as dozer controller 41. The systems and methods of the disclosure may be used with any machine propulsion and drivetrain mechanisms applicable in the art including hydrostatic, electric, or a mechanical drive.

Dozer 12 may include a ground engaging work implement such as blade 20 pivotally connected to frame 21 by arms 26 on each side of dozer 12. First hydraulic cylinder 27 coupled to frame 21 supports blade 20 in the vertical direction, and allows blade 20 to move up and down vertically from the point of view of FIG. 3. A second hydraulic cylinder 28 on each side of the dozer 12 allows the pitch angle of blade tip to change relative to a centerline of the machine.

Dozer 12 may include a cab 30 that an operator may physically occupy and provide input to control the machine. Cab 30 may include one or more input devices 31 through which the operator may issue commands to control the propulsion and steering of the machine as well as operate various implements associated with the machine.

Dozer 12 may be equipped with a plurality of sensors that provide data indicative (directly or indirectly) of various operating parameters of the machine. The term "sensor" is meant to be used in its broadest sense to include one or more sensors and related components that may be associated with the dozer 12 and that may cooperate to sense various functions, operations, and operating characteristics of the machine.

One or more movement sensors may be positioned on the dozer 12 for sensing movement of the dozer 12 and generating movement signals indicative of movement of the machine. A pitch rate sensor 32 (e.g., a gyroscope) may be provided or mounted on the dozer 12, on the blade 20, or on an implement frame member to which the blade is mounted. The pitch rate sensor 32 may be used to provide a pitch rate signal indicative of a measured pitch rate of the dozer 12 or the blade 20, depending upon the location of the sensor. The pitch rate sensor 32 may be a "stand-alone" sensor or part of a multi-function sensor such as an inertial measurement unit that also measures the acceleration of the dozer 12 along various axes. The pitch rate measured by the pitch rate sensor 32 is indicative of the rate of change of the pitch angle of the sensor.

An acceleration sensor 33 (e.g., a 3-axis accelerometer) may also be provided as a separate component or part of a multi-function sensor. The acceleration sensor 33 may be used to provide an acceleration signal indicative of acceleration of the dozer 12 relative to a gravity reference. If the acceleration sensor 33 is not part of a multi-function sensor, it may be positioned adjacent the pitch rate sensor 32 or at another location on dozer 12.

One or more implement position sensors indicated generally at 35 may be provided for determining the position of the blade 20 relative to the dozer 12. In one embodiment, the implement position sensors 35 may be rotary potentiometers associated with the pivot joints between the dozer 12, the arms 26 and the blade 20. In another example, sensors may be associated with the hydraulic cylinders to determine the displacement of each cylinder. The displacement of the cylinders may be used to determine the position of the blade 20. Other types of sensors are also contemplated.

Figure 3:
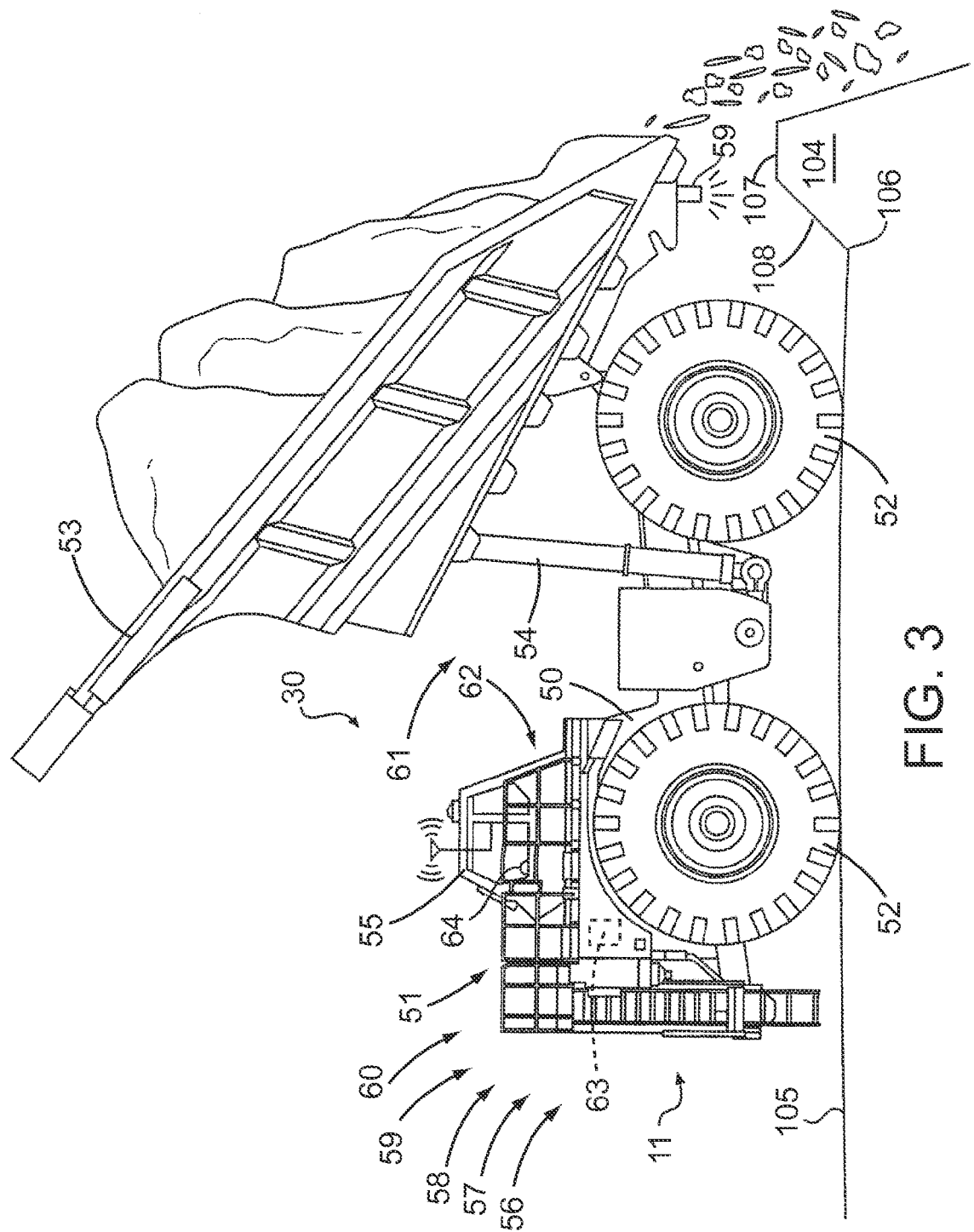
FIG. 3 is a diagrammatic illustration of a haul machine in accordance with the disclosure.

A position sensing system 36, as shown generally by an arrow in FIG. 3 indicating association with the dozer 12, may include a position sensor 37 to sense a position of the machine relative to the work site 100. The position sensor 37 may include a plurality of individual sensors that cooperate to provide signals to dozer controller 41 to indicate the position of the dozer 12. In one example, the position sensor 37 may include one or more sensors that interact with a positioning system such as a global navigation satellite system or a global positioning system to operate as a position sensor. The dozer controller 41 may determine the position of the dozer 12 within work site 100 as well as the orientation of the machine such as its heading, pitch and roll. In other examples, the position sensor 37 may be an odometer or another wheel rotation sensing sensor, a perception based system, or may use other systems such as lasers, sonar, or radar to determine the position of dozer 12.

A range sensing system 38 incorporating vision, laser, radar, sonar, or LIDAR may be used to detect objects that are within a predetermined distance of the dozer 12. The dozer 12 may further include a slope or inclination sensor such as pitch angle sensor 39 for measuring the slope or inclination of the dozer relative to a ground or earth reference. Other types of sensors are also contemplated.

Dozer 12 may be controlled by a dozer control system 40 as shown generally by an arrow in FIG. 3 indicating association with the machine. The dozer control system 40 may include an onboard electronic control module or controller such as dozer controller 41. The dozer controller 41 may receive input command signals from a wireless network system 120 (FIG. 1), remote control input command signals from an operator using a remote control unit to operate dozer 12 remotely, or operator input command signals from an operator operating the dozer 12 from within cab 30. The dozer controller 41 may control the operation of various aspects of the dozer 12 including the drivetrain as well as the hydraulic systems and other systems that operate the work implements. The dozer control system 40 may utilize various input devices to control the dozer 12 and one or more sensors to provide data and input signals representative of various operating parameters of the dozer 12 and the environment of the work site 100.

The dozer controller 41 may be an electronic controller that operates in a logical fashion to perform operations, execute control algorithms, store and retrieve data and other desired operations. The dozer controller 41 may include or access memory, secondary storage devices, processors, and any other components for running an application. The memory and secondary storage devices may be in the form of read-only memory (ROM) or random access memory (RAM) or integrated circuitry that is accessible by the dozer controller. Various other circuits may be associated with the dozer controller 41 such as power supply circuitry, signal conditioning circuitry, driver circuitry, and other types of circuitry.

The dozer controller 41 may be a single controller or may include more than one controller disposed to control various functions and/or features of the dozer 12. The term "controller" is meant to be used in its broadest sense to include one or more controllers and/or microprocessors that may be associated with the dozer 12 and that may cooperate in controlling various functions and operations of the machine. The functionality of the dozer controller 41 may be implemented in hardware and/or software without regard to the functionality.

The dozer controller 41 may rely on one or more data maps relating to the operating conditions and the operating environment of the dozer 12 and the work site 100 that may be stored in the memory of dozer controller. Each of these data maps may include a collection of data in the form of tables, graphs, and/or equations.

The dozer control system 40 may interact with an offboard control system 125 located remotely from the dozer 12 such as at a command center 121 (FIG. 1). The offboard control system 125 may include an offboard controller (not shown). The offboard controller may be identical or similar in structure and operation to dozer controller 41 and the description is not repeated herein. Wireless network system 120 may be used to transmit signals and otherwise communicate between the onboard systems on each machine and the offboard control system 125. The dozer 12 and the command center 121 may each include communication devices such as wireless transceivers (not shown) to permit wireless signal transmission between the dozer and the command center. The functionality of the systems described herein may be distributed so that certain functions are performed onboard a machine such a dozer 12 through dozer control system 40 and other functions are performed remotely such as through offboard control system 125.

FIG. 3 shows a diagrammatic illustration of a haul machine 11 for hauling or transporting material. The haul machine 11 includes a frame 50, and a prime mover such as engine 51 may be operatively connected to drive wheels 52 to propel the machine. The haul machine 11 may use any type of machine propulsion and drivetrain mechanisms including hydrostatic, electric, or a mechanical drive. A payload container 53 may be pivotally mounted on frame 50 and configured to carry material. Actuators such as hydraulic cylinders 54 may extend between the frame 50 and the payload container 53. The actuators may be actuated to dump material within the payload container 53 as desired.

Haul machine 11 may include a cab 55 that an operator may physically occupy and provide input to control the machine. Cab 55 may include one or more input devices 64 through which the operator may issue commands to control the propulsion and steering of the machine as well as dump the payload container 53.

Haul machine 11 may be equipped with a plurality of sensors indicated generally that provide data indicative (directly or indirectly) of various operating parameters of the machine. As stated above with respect to dozer 12, the term "sensor" is meant to be used in its broadest sense to include one or more sensors and related components that may be associated with the haul machine 11.

The plurality of sensors of haul machine 11 may include a pitch rate sensor 56, an acceleration sensor 57, a position sensing system 58, a range sensing system 59, and a pitch angle sensor 60. These sensors may be identical or similar to those described above with respect to dozer 12 and thus the descriptions thereof are not repeated herein. In addition, haul machine 11 may include a payload container sensor 61 to determine the position of the payload container 53 relative to frame 50 or some other point of reference.

Haul machine 11 may be controlled by a haul machine control system 62 as shown generally by an arrow in FIG. 3 indicating association with the machine. The haul machine control system 62 may include an onboard electronic control module or controller such as haul machine controller 63. The haul machine control system 62 and the haul machine controller 63 may be identical or similar in structure and operation to the dozer control system 40 and the dozer controller 41, respectively, and thus their descriptions are not repeated herein.

The haul machines 11 and the dozer 12 may be configured to be operated autonomously, semi-autonomously, or manually. In case of semi-autonomous or manual operation, the machines may be operated by remote control and/or by an operator physically located within their cab. If a machine is configured to operate via a remote control system, a visual image system (not shown) such as a camera system may be provided for generating visual images indicative of a point of view relative to the machine. The visual image signals may be transmitted wirelessly through wireless network system 120 to a system remote from the machine such as the offboard control system 125.

Figure 4:
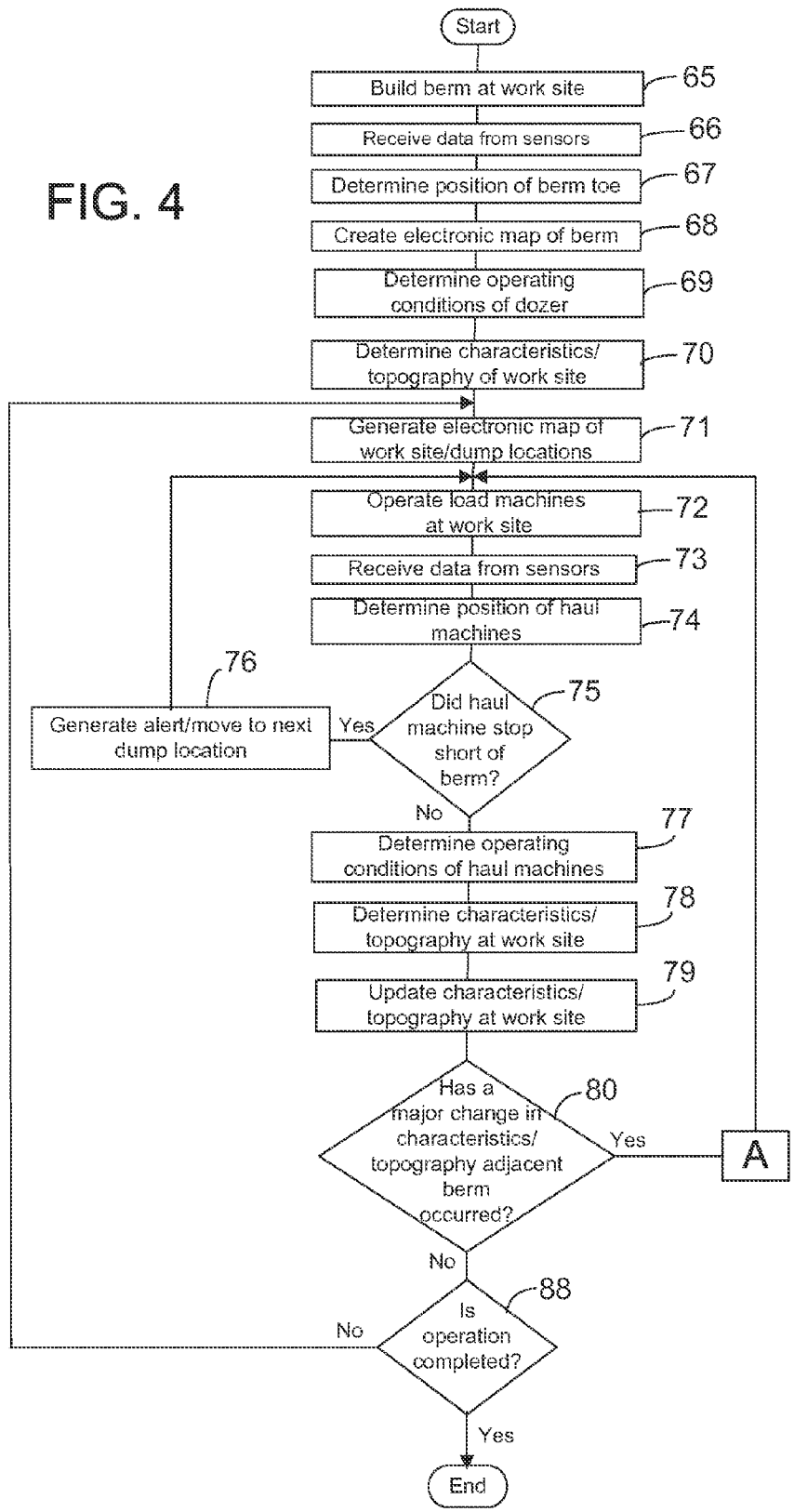
FIG. 4 is a flowchart of a process for operating haul machines and a dozer at a work site while forming a berm and generating an electronic map of the berm.

Referring to FIG. 4, a flowchart of the operation of haul machines 11 and dozer 12 at work site 100 is depicted. At stage 65, the dozer 12 may be operated to build a structure or raised contour such as a berm 104 that extends along the length of the high wall 103. In doing so, an operator may move material around the work site 100 with blade 20 to a position adjacent the high wall 103. Berm 104 may be any size (in one example, approximately 6 feet tall) and may require that an operator perform multiple operations to form the berm at each location along or adjacent the high wall 103. As best seen in FIG. 3, the berm 104 includes a base or toe 106 at the intersection of the beginning of the berm (i.e., farthest from high wall 103) and the work surface 105. An upper surface 107 and may be generally flat or have another configuration a sidewall 108 extending between the toe 106 and the upper surface. In one example, an operator may form the berm 104 by initially positioning material adjacent the high wall 103. The operator may repeatedly move the dozer 12 and blade 20 in a variety of directions (including moving the dozer towards and away from the high wall 103) until a berm 104 having the desired dimensions (e.g., length and height) and shape (e.g., angle of the sidewall 108) is formed. This process may be repeated by operators operating one or more dozers 12 to form the desired berm 104 along the high wall 103.

While the operator uses dozer 12 to build the berm 104, the dozer controller 41 may monitor the position of the machine and the sensed position data may be used by the dozer control system 40 and the offboard control system 125 to generate an electronic map of the berm. More specifically, at stage 66, the dozer controller 41 may receive data from the position sensor 37. At stage 67, the dozer controller 41 and the position sensing system 36 may determine the position of the dozer 12 based upon the data from the position sensor 37. Inasmuch as the position sensor 37 may not be positioned immediately adjacent the tip 29 of the blade 20, the dozer controller 41 may utilize the known dimensions of the dozer 12 together with the data from the position sensors 37 to determine the position of the tip 29 of blade 20. In some operations, the position of the tip 29 of the blade 20 may be used to determine the position of the base or toe 106 of the berm 104.

In one example, an operator may manually engage an input device 31 such as a switch or button when the tip 29 of the blade 20 is adjacent the base or toe 106 of the berm 104 at a particular location along the high wall 103. More specifically, as the berm forming process at a particular location along the high wall 103 is completed, an operator may engage one of the input devices 31 to log or store the position of the tip 29 of the blade 20 as a reference position. By repeating this process, the operator may generate a plurality of reference positions that may be used to generate an electronic map of the edge of the berm 104. In one embodiment, the offboard controller may interpolate between the plurality of reference position to generate an electronic map of the edge or toe 106 of the berm 104.

In another example, the range sensing system 38 may be used to determine the position of the berm 104 during the berm forming process. Using such a system, the dozer controller 41 may receive data from range sensing system 38 and use that information with the known position of the dozer 12 based upon data from the position sensing system 36 to determine the position of the berm 104 and its configuration. The range sensing system 38 may be used to determine the position of the base or toe 106 of the berm 104 and, in some instances, the height and inclination or shape of the sidewall 108 of the berm. In other instances, the range sensing system 38 may be used to determine the height and inclination or shape of the sidewall 108 of the berm 104. The dozer controller 41 may use the height and inclination of the sidewall 108 and extrapolate the surface of the sidewall until it reaches the known position of the work surface 105 to determine the toe 106 of the berm 104.

In a manual process, an operator may manually engage one of the input devices 31 to activate the range sensing system 38 and to log or store the position of the toe 106 and the configuration (the height and inclination of sidewall 108) of the berm 104. In an automated process, data may be received from the range sensing system 38 and the position and the characteristics of the berm 104 may be determined as the berm is being formed. The last sensed position and characteristics for each location of the berm 104 along the high wall 103 may be determined by comparing the different positions of the berm 104 as it is being formed and logging or storing only the data for the last sensed position. In an alternate process, the position and characteristics of the berm 104 for each location along the high wall 103 may be logged or stored and then the stored position and characteristics of the berm replaced as a new position and characteristics are determined.

In still another example of an automated process, the position of the toe 106 of the berm 104 may be determined by using the position sensing system 36 together with an implement load monitoring system designated generally by reference number 42 in FIG. 3. The implement load monitoring system 42 may include a variety of different types of implement load sensors depicted generally by reference number 43 in FIG. 3 to measure the load on the ground engaging work implement or blade 20. As the dozer 12 moves forward with material on the blade 20, the implement load monitoring system 42 will register a load on the blade. In some instances, the blade load may be reduced either due to filling a hole or the material falling off the edge. Still further, upon moving the dozer 12 rearwardly, the load on the blade 20 will be reduced to approximately zero. While forming the berm 104, the dozer 12 may move forwardly and rearwardly while manipulating the material with the blade 20 to form the berm. By monitoring the load on the blade 20 for the point at which the blade load is substantially reduced below a reasonable threshold, the location of the toe 106 of the berm 104 may be identified. The dozer controller 41 may then use the position sensing system 36 to determine the position of the dozer 12 and the tip 29 of the blade 20 to determine the position of the toe 106 of the berm 104. The position of the toe 106 of the berm 104 may thus be automatically generated and logged or stored.

It should be noted that if the dozer 12 moves too close to the high wall 103, material being moved by blade 20 may be pushed over the high wall 103 and the load on the blade 20 reduced. However, by using another system or sensor such as acceleration sensor 33 or position sensing system 36, dozer controller 41 may determine whether the machine is moving forward or backwards when the load is reduced. Accordingly, the dozer controller 41 may be configured to only log or store the position of the toe 106 of the berm 104 when the load on the blade 20 is reduced and the dozer 12 is moving rearwardly.

In one embodiment, the implement load sensor system 43 may embody one or more pressure sensors 44 for use with one or more hydraulic cylinders, such as second hydraulic cylinders 28, associated with blade 20. Signals from the pressure sensors 44 indicative of the pressure within the second hydraulic cylinders 28 may be monitored by dozer controller 41. Upon receipt of a signal indicating a substantial decrease in pressure within the second hydraulic cylinders 28 (and confirming that the dozer 12 is moving backwards, if desired), the dozer controller 41 may determine the position of the toe 106 of the berm 104 for that particular location along the high wall 103. Other manners of determining a decrease in cylinder pressure associated with a decrease in the load on blade 20 are contemplated, including other manners of measuring the pressure within second hydraulic cylinders 28 and measuring the pressure within other cylinders associated with the blade.

In another embodiment, the implement load sensor system 43 may embody sensors for measuring a difference between output from the engine 22 and the output from the torque converter 25. More specifically, an engine speed sensor 45 may be utilized to generate a signal indicative of the speed or output of the engine 22. A torque converter speed sensor 46 may be utilized to monitor the output speed of the torque converter 25. During an operation such as moving material with blade 20, the engine output speed indicated by engine speed sensor 45 and the torque converter output speed indicated by torque converter speed sensor 46 may be relatively constant. Upon reducing the load on the blade 20, a change in the relative speeds between the engine 22 and the torque converter 25 may occur. Accordingly, the position of the toe 106 of the berm 104 may be determined by monitoring the difference between the engine speed and the torque converter speed to determine a decrease in load on the blade 20 that indicates disengagement with the berm 104.

Other manners of measuring differences between prime mover output and other components within the propulsion and drivetrain mechanisms that are reflective of a change in load on the blade 20 are also contemplated. Still further, in alternate embodiments in which the machine propulsion and drivetrain mechanisms are hydrostatic or electric, the implement load sensor system 43 may embody other sensors that detect a difference between output from the prime mover and other aspects of the propulsion and drivetrain mechanisms that may be used by the dozer controller 41 to detect a decrease in load on the blade 20.

If desired, a zone or area may be established that extends a predetermined distance from the high wall 103 or the berm 104 along the length thereof. The dozer controller 41 or the offboard controller may be configured so that data used to determine the position of the toe 106 of the berm 104 is only utilized when the dozer 12 is operating within the zone. In one example, a reduction in load on the blade 20 that occurs in conjunction with reversing movement of the dozer 12 may only be used to indicate a position of the toe 106 of the berm 104 if the machine is less than a predetermined distance from the high wall 103 or berm 104.

The load on the blade 20 may also be affected by the slope of the terrain upon which the dozer 12 is moving. Accordingly, if desired, the accuracy of the implement load measurement may be increased by utilizing the implement load sensor system 43 in conjunction with the pitch angle sensor 39. For example, if the dozer 12 is moving uphill, the load on the blade 20 may be higher due to gravity as compared to a machine operating in the same conditions on flat terrain. Similarly, the load on the blade 20 may be lower for the same conditions when operating the machine in a downhill orientation. By determining the slope of the terrain, the dozer controller 41 may more accurately determine changes in the load on the blade 20.

In one example, the position data as well as the configuration of the berm 104, if applicable, may be logged or stored locally on the dozer controller 41 and transmitted to the offboard controller of the offboard control system 125 after the berm has been formed. In another example, the position data as well as the configuration of the berm 104, if applicable, may be transmitted to the offboard controller of the offboard control system 125 as the berm is being formed. Either while or after the berm 104 is being formed, the offboard controller of the offboard control system 125 may generate and store an electronic map of the berm at stage 68. In an alternate embodiment, rather than generating and storing the electronic map of the berm 104 at the offboard controller, the electronic map may be generated by and/or stored within dozer controller 41. Still further, the controller of a machine such as dozer 12 may operate as an offboard controller with respect to other machines such as haul machines 11.

While moving about the work site 100, various sensors on the dozer 12 may be used to monitor and determine at stage 69 the operating conditions of the dozer 12 based upon the data received from the various sensors at stage 66. The operating conditions may be used at stage 70 to determine the characteristics and topography of the work site 100. The characteristics and topography of the work site 100 may be added to an electronic map of the work site 100 that includes the electronic map of berm 104. The electronic map of the work site 100 may be used for any purpose, such as planning routes of haul machines 11 being moved autonomously. For example, pitch angle sensor 39 may be used to determine the slope of the work surface 105 of the work site 100 at various locations as the dozer 12 moves about the work site. Upon collecting this information, it may be added to the electronic map of the work site 100 for subsequent use, if desired. Still further, the range sensing system 38 may also or alternatively be used to determine the topography of the work site 100 at locations spaced from the berm 104. For example, the range sensing system 38 may be used to sense obstacles at the work site 100 and also detect changes in the work surface 105 such as those caused by material falling from a haul machine 11. The electronic map may be updated based upon data generated by the range sensing system 38.

In another example, the operating conditions of the dozer 12 may be used to monitor slip of the tracks 24 on the work surface 105. The dozer controller 41 may measure a drive signal from a drive speed measurement sensor 47 that is indicative of the speed of the tracks 24. The dozer controller 41 may use the actual or drive speed of the tracks 24 to determine the expected speed of the dozer 12 and then compare the expected speed to the actual speed of the machine to determine the amount of track slip. The amount of track slip of the dozer 12 may be stored as part of an electronic map of the work site 100 and used to direct other machines as they move about the work site. For example, it may be desirable for machines such as haul machines 11 to avoid certain areas due to anticipated reductions in traction.

Once the electronic map of berm 104 has been generated and the characteristics and topography of work site 100 have been determined, offboard control system 125 may generate at stage 71 an electronic map of dump targets 112 at dump location 102 of work site 100. More specifically, the offboard controller may use the map of the toe 106 of the berm 104 and any desired groupings 111 of the dump targets 112 to determine the location of the individual dump targets. Dump targets 112 may be virtual targets within the electronic map of work site 100 and have coordinates that correspond to actual physical locations at dump location 102.

Figure 6:
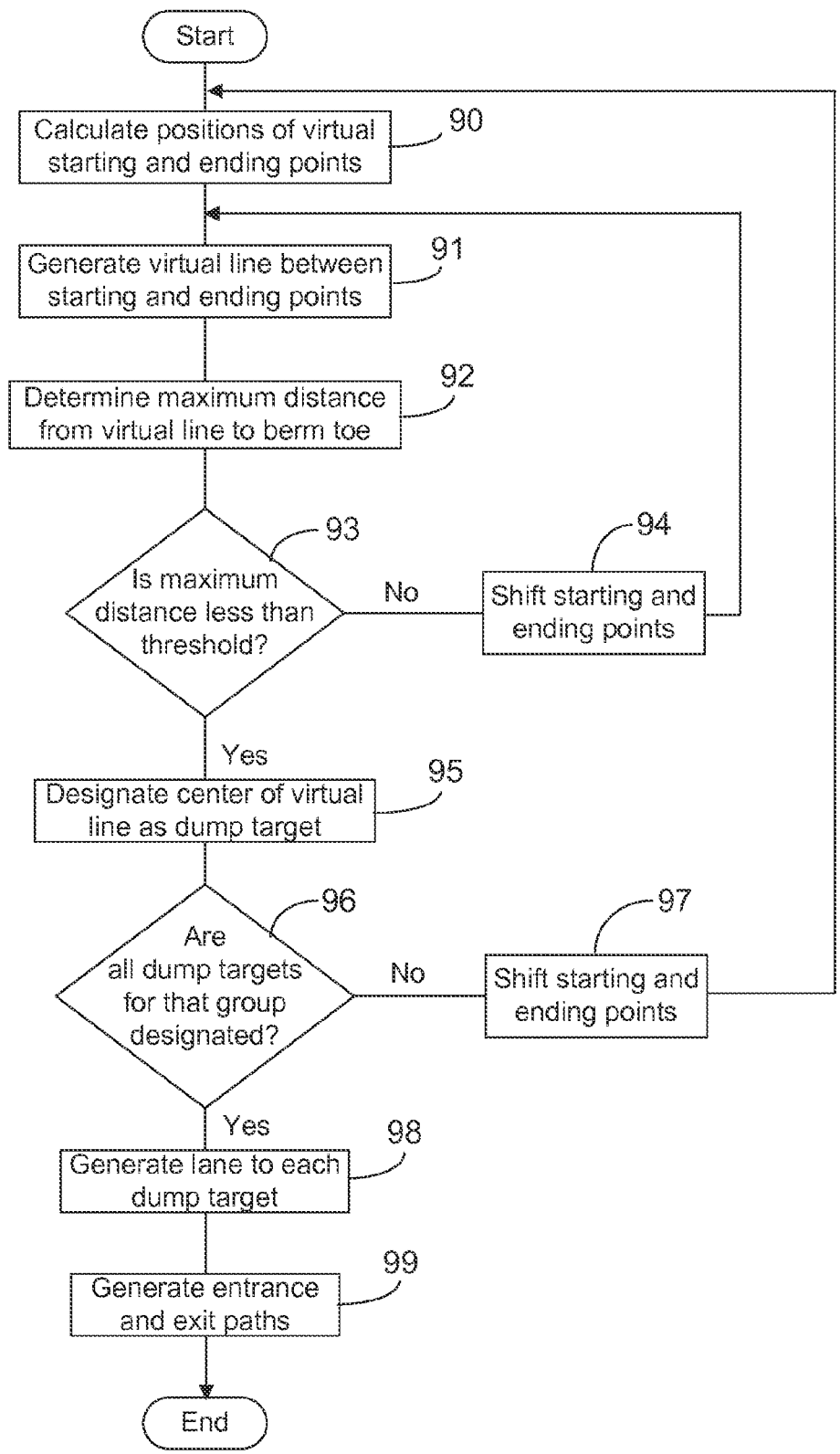
FIG. 6 is a flowchart of a process of for establishing a plurality of dump targets along a portion of the berm.
Figure 7:
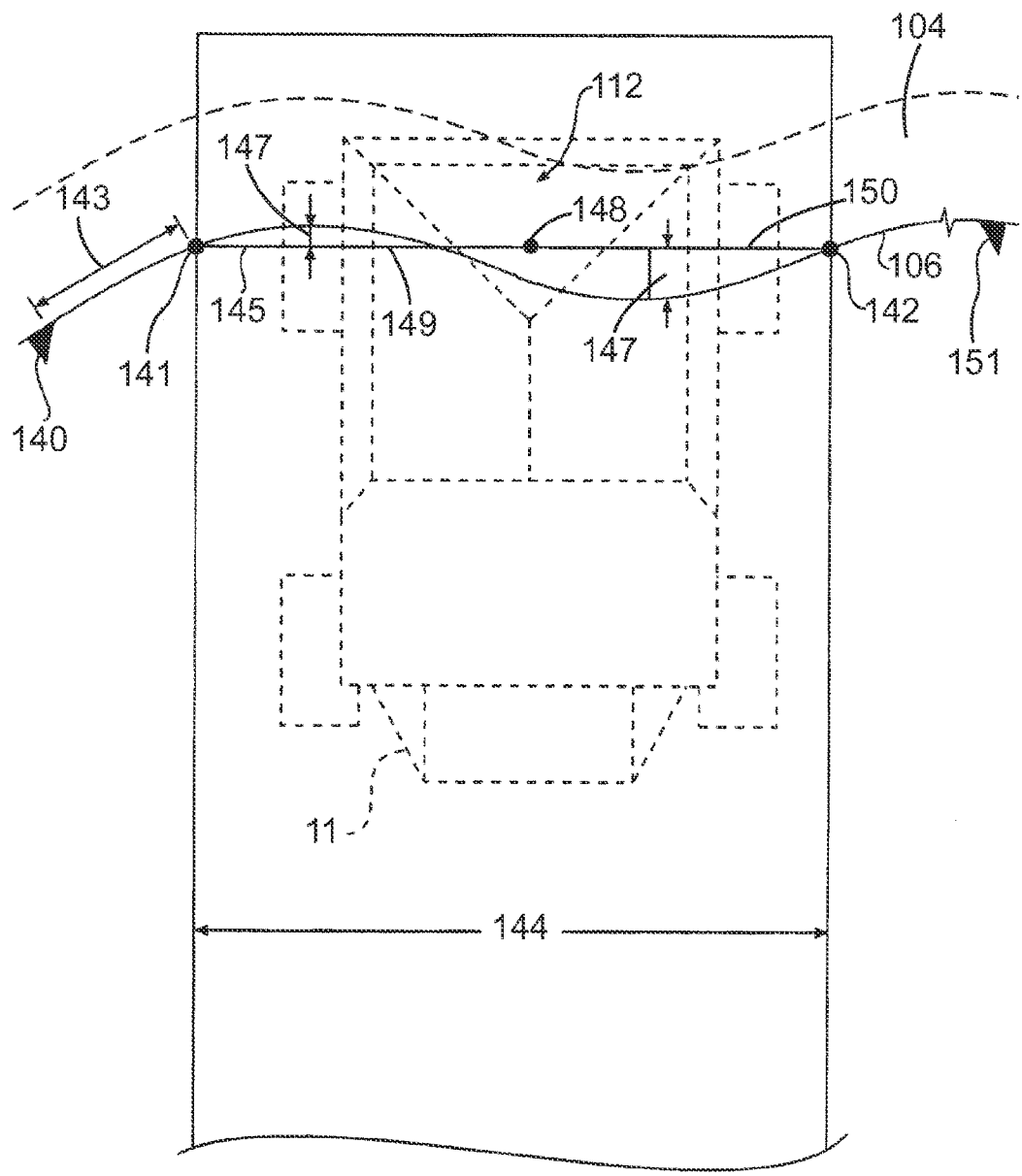
FIG. 7 is a schematic view of a portion of the berm in connection with the process of FIG. 6.

Referring to FIGS. 6-7, an example of a process for determining the location of the dump targets 112 for a particular grouping 111 is explained below. At stage 90, the offboard controller may, starting from a first virtual boundary marker 140 (i.e., a boundary marker in the electronic map of work site 100 of the particular grouping 111), calculate the positions of a virtual starting point 141 and a virtual ending point 142. Starting point 141 may lie generally on toe 106 and be spaced apart from boundary marker 140 by a distance 143 approximately equal to one-half of a width of haul machine 11. Ending point 142 may also lie generally on toe 106 and be spaced apart from virtual starting point 141 by a distance 144 approximately equal to a width of lane 115. In one embodiment, the width of lane 115 may be approximately equal to 1.4-2 times the width of haul machine 11.

The offboard controller may then draw or otherwise generate at stage 91 a virtual line 145 that extends between virtual starting point 141 and virtual ending point 142. In some embodiments, virtual line 145 may be located completely inward of toe 106. In other embodiments, however, virtual line 145 may cross toe 106 (as shown in FIG. 7), such that a first portion 149 of virtual line 145 is located inward of toe 106 and a second portion 150 of virtual line 145 is located outward of toe 106. The offboard controller may then determine at stage 92 a maximum distance 147 between virtual line 145 and toe 106 within each of the first and second portions in a direction generally orthogonal to virtual line 145. At decision stage 93, the maximum distance 147 may be compared to a threshold distance.

If the maximum distance 147 anywhere along the virtual line 145 exceeds the threshold distance, virtual starting point 141 and virtual ending point 142 may be determined to be invalid. Invalid points may generally be considered to be associated with a location not suited or less desirable for dumping. Dumping in such a location may result in too much material being deposited inward of berm 104 and requiring time-consuming cleanup operations, or a likelihood of damage to berm 104. If the virtual starting point 141 and virtual ending point 142 are determined to be invalid, both the virtual starting point 141 and the virtual ending point 142 may be shifted at stage 94 farther away from boundary marker 140 by approximately the same distance. The distance that the virtual starting point 141 and the virtual ending point 142 are shifted may be set in any of a variety of manners. For example, the distance may be pre-set within the offboard controller, set by authorized personnel at the work site 100 or another location, set based upon the pattern of the map of the berm 104, or in any other desired manner. After shifting the virtual starting point 141 and the virtual ending point 142, the process beginning at stage 66 may be repeated.

If the maximum distance 147 is less than the threshold distance at decision stage 68, virtual starting point 141 and virtual ending point 142 may be determined to be valid. In this situation, a lengthwise center point 148 of virtual line 145 may be designated at stage 95 as a dump target 112 by the offboard controller.

Additional dump targets 112 may be established or generated in a similar manner. More specifically, after generating a dump target 112 at stage 95, the offboard controller may determine at decision stage 96 whether all of the dump targets for a particular grouping 111 have been identified. If all of the dump targets have not been identified, a virtual starting point 141 of a subsequent dump target 112 may be shifted at stage 97 by a distance 143 (e.g., approximately one-half of the width of haul machine 11) from the virtual ending point 142 of the previous dump target. The process for generating additional dump targets may then be repeated beginning at stage 90 in the same manner described above until all dump targets 112 within a particular grouping 111 have been generated or until virtual ending point 142 of a potential dump target 112 extends past a second virtual boundary marker 151 of the particular grouping 111.

If all of the dump targets 112 have been identified at decision stage 96, the offboard controller may generate at stage 98, a lane 115 leading to each of the generated dump targets 112. In addition, the offboard controller may generate at stage 99 the entrance paths 113 and exit paths 114 that connect each lane 115 within a grouping 111 to main travel path 110 (FIG. 1). The offboard controller may determine the shapes, locations, dimensions, and/or curvatures of the entrance paths 113 and exit paths 114 based upon the size of and spacing between dump targets 112, the size and/or spacing of groupings 111, the characteristics and topography of dump location 102, and/or based upon the characteristics of haul machines 11.

The process of stages 90-99 described above may be separately completed for each grouping 111 of dump targets 112. In an alternate process, the dump targets 112 for all of the groupings 111 may be completed before determining the lanes 115 and the entrance path 113 and the exit path 114 for each dump target.

It should be noted that the offboard controller may divide dump location 102 into groupings 111, establish lanes 115, establish dump targets 112, and/or generate the different travel paths to and from dump targets 112 based upon any number of different site- and user-related inputs. In one example, the For example, when dozer 12 changes (i.e., increases, decreases, or reshapes) an accessible area of dump location 102, such as berm 104, the offboard controller may be configured to divide or re-divide dump location 102 based on the new size or shape to accomplish the user-defined goals.

After the dump location 102 is divided into groupings 111 and dump targets 112, lanes 115, entrance paths 113, and exit paths 114 have been established, the offboard controller may be configured to regulate the movements of haul machines 11 relative to different routes that include these travel paths and dump targets. In the case of autonomously controlled haul machines 11, the haul machine controller 63 of the corresponding machines may be instructed by the offboard controller to direct operations of haul machines 11 relative to the different travel paths and dump targets 112. In the case of manually controlled haul machines 11, the haul machine controller 63 may cause the routes to different dump targets 112 to be displayed on an electronic representation of work site 100 provided on a display device (not shown) within the haul machine 11.

Referring back to FIG. 4, at stage 72, the haul machines 11 may be operated at the work site 100 such as to dump their payloads over the high wall 103. While each haul machine 11 moves about the work site 100, data may be collected at stage 73 by its haul machine controller 63 from the various sensors on the haul machine. At stage 74, the haul machine controller 63 may determine the position of each haul machine 11 as it moves about work site 100 and may communicate its position to the offboard controller.

During the process of dumping a payload of a haul machine 11 over the high wall 103, the coordinates for a particular dump target 112 may be assigned as a target for each haul machine 11. Each haul machine 11 may be moved autonomously or manually to the dump target 112 until it engages the berm 104. Autonomous detection of the engagement of a haul machine 11 with berm 104 may be accomplished in many different ways. For example, range sensing system 59 may be used to recognize the shape and thereby detect the location of berm 104. Alternatively or additionally, acceleration sensor 57 may be used to detect a sudden deceleration caused by engagement with the berm 104. In another example, signals from a pitch angle sensor 60 may be utilized. Other manners of detecting the engagement with berm 104 are also contemplated.

In one embodiment, the first time a haul machine 11 engages the berm 104 at a particular dump target 112, the coordinates of the corresponding dump target 112 within the electronic map of the work site 100 may be reset to the location of designated point (e.g., the center point of the rear axle) of the haul machine 11 at the time of engagement. In this manner, the coordinates of the dump target 112 within the electronic map may be confirmed and all haul machines 11, during each subsequent visit to the same dump target 112, may be decelerated as they approach the berm 104. In other words, the initial engagement of the first haul machine 11 to visit a particular dump target 112 at berm 104 may be used to confirm the location of berm. Until the first haul machine 11 actually engages the berm 104, the toe location 106 of berm 104 may only be an estimated location. The engagement of the first haul machine 11 establishes the actual location of the toe 106 of berm 104, which can then be used for all subsequent visits to the particular dump target 112. By using an actual location of the toe 106 instead of an estimated location, all subsequent haul machines 11 to visit the particular dump target 112 may be controlled to stop at the toe 106 of berm 104 without impacting the berm with a significant force. High-force impacts may cause damage to the berm 104 and premature or excessive wear to haul machine 11.

At decision stage 75, the haul machine controller 63 or the offboard controller may determine whether the haul machine 11 stopped at the berm 104 sufficiently close to the berm to perform the dumping operation. If the haul machine 11 stops sufficiently short of the berm 104 so that a dumping operation is undesirable, the haul machine controller 63 or the offboard controller may generate at stage 76 an alert signal and the haul machine may be directed to another (such as the next available) dump target 112 at stage 72. The position of the haul machine 11 upon the generation of the alert signal as well as the identity of the dump target 112 may be communicated to the offboard controller and stored within the electronic map of the work site 100.

Data from the sensors on haul machine 11 may also be used to monitor and determine at stage 77 the operating conditions of the haul machine. The operating conditions may be used at stage 78 to determine the characteristics and topography of the work site 100 in a manner identical or similar to that described above with respect to dozer 12. As the haul machines 11 are operating, the characteristics and topography of the work site 100 may change over time. For example, as a haul machine 11 dumps its payload over the high wall 103, some of the material may fall onto the berm 104, thus changing the configuration of the berm and the location of toe 106. In other instances, material may fall from the haul machines 11 as they travel about the work site 100. Still further, changes in weather conditions may also result in changes to the characteristics and topography at the work site 100.

As the characteristics and topography of the work site 100 change, data from the sensors on the haul machines 11 may change to reflect such changes. For example, pitch angle sensor 60 on a haul machine 11 may reflect changes in topography of the work site 100. In addition, various systems on the haul machine 11 may be used to determine wheel slip along work surface 105. For example, the haul machine controller 63 may measure signals that are indicative of the speed of the drive wheels 52. The haul machine controller 63 may use the actual or drive speed of the drive wheels 52 to determine the expected speed of the haul machine 11 and then compare the expected speed to the actual speed of the machine to determine the amount of wheel slip. Increases in the amount of wheel slip may be indicative of soft material due to changes in weather conditions or due to the addition of material at the work site 100 that fell from the haul machines 11 as they move about the work site. Changes in the characteristics (such as wheel slip) and topography of the work site 100 as well as any alerts generated at stage 76 may be used to update the characteristics or topography of the work site 100 at stage 79.

As the haul machines 11 operate at dump location 102, the offboard controller may monitor the conditions of the berm 104 at decision stage 80 to determine if a major or significant change to the characteristics or topography of the work site 100 adjacent the berm have occurred. In some instances, a major change may be deemed to have occurred if the change is significant enough to warrant a change in the position or availability of any dump targets 112, their groupings 111, the entrance paths 113, the exit paths 114, or lanes 115 within the electronic map. In other instances, the degree as well as the type of change may be used to determine whether a major change has occurred. Other definitions of a major change are contemplated.

As an example, the toe 106 of the berm 104 may move away from its original location as the haul machines 11 dump their payload at the berm. Such movement of the toe 106 may result in less material being dumped over the high wall 103 and more material falling onto the berm 104 which may increase the rate at which the toe is moving away from the high wall. In one example, movement of the toe 106 greater than a predetermined distance from its original location may be considered a major change. In another example, a haul truck 11 may impact the berm 104 with sufficient force so as to move the toe towards the high wall 103. In such case, a relatively small change in position of the toe 106 relative to its original location may be considered a major change.

Figure 5:
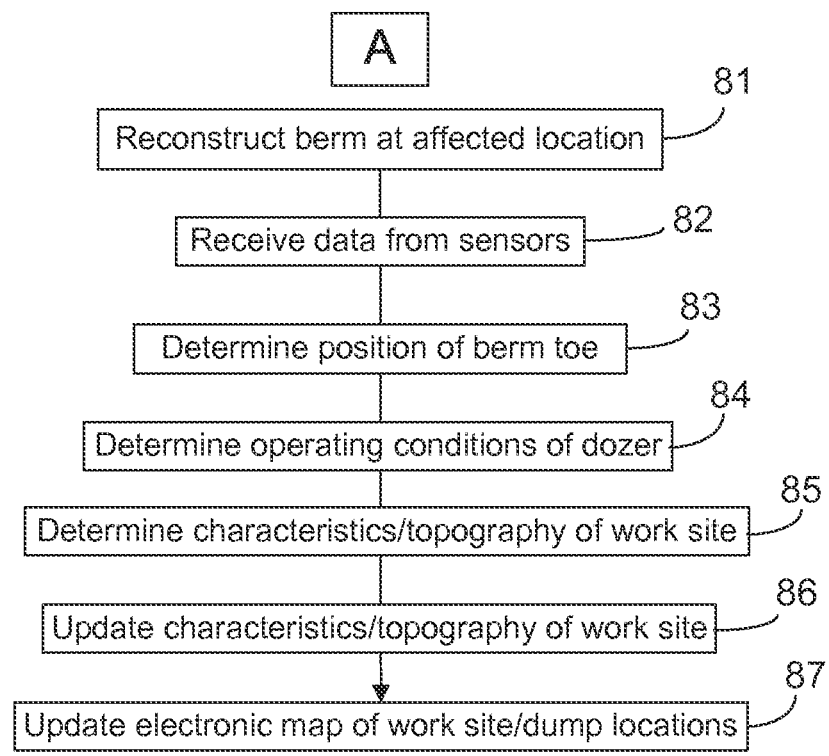
FIG. 5 is a flowchart of a further aspect of the process of FIG. 4.

If a major change in the characteristics or topography of the work site 100 adjacent the berm has occurred, the process "A" according to FIG. 5 may be followed. At stage 81, the dozer 12 may be operated to reconstruct the berm 104 at the affected location along the high wall 103. In doing so, an operator may move material around the work site 100 with blade 20. The operator may repeatedly move the dozer 12 and blade 20 in a variety of directions until the affected portion of the berm 104 has the desired dimensions and shape.

While the operator uses dozer 12 to reconstruct the affected portion of the berm 104, the dozer controller 41 may monitor the position of the machine and the sensed position data may be used by the dozer control system 40 and the offboard control system to update the electronic map of the berm. In an example, at stage 82, the dozer controller 41 may receive data from the various sensors on the dozer 12. At stage 83, the dozer controller 41 may use the data from the sensors to determine the position of the toe 106 of the affected portion of the berm 104. As set forth above, the position of the toe 106 may be determined manually or automatically and in many different manners. For example, the dozer controller 41 may use the position sensing system 36 and the known dimensions of the dozer 12 to determine the position of the tip 29 of blade 20. In another example, the range sensing system 38 may be used with the position sensing system 36 to determine the position of the toe 106 of the berm 104 during the berm forming process. In still another example, the position of the toe 106 of the berm 104 may be determined by using the position sensing system 36 together with an implement load monitoring system 42.

At stage 84, while moving about the work site 100, various sensors on the dozer 12 may generate data that is used to monitor and determine the operating conditions of the dozer 12. The operating conditions may be used at stage 85 to determine the characteristics and topography of the work site 100. The characteristics and topography of the work site 100 may be updated at stage 86. At stage 87, the offboard controller may use the updated characteristics and topography of the work site 100 to update the entire electronic map including the dump targets 112, the entrance paths 113, the exit paths 114, and lanes 115 within the electronic map of the work site 100. Still further, the groupings 111 may also be updated if desired.

Referring back to FIG. 4, if a major change in the characteristics or topography of the work site 100 adjacent the berm has not occurred, the offboard controller may determine at decision stage 88 whether the operation at the work site 100 is completed. If the operation is not completed, the system may return to stage 71 and continue to operate by moving haul machines 11 about the work site 100.

Although decision stage 80 refers to determining whether a major change to the characteristics or topography has occurred adjacent the berm 104, the system disclosed herein is not limited to monitoring changes adjacent the berm. For example, the offboard controller may be configured to determine whether a major change has occurred anywhere at the work site 100 such that the operation of the haul machines may be affected. In such case, it may be desirable to alter their operation as well as the dump targets 112, their groupings 111, the entrance paths 113, the exit paths 114, and lanes 115 within the electronic map.

INDUSTRIAL APPLICABILITY

The industrial applicability of the system described herein will be readily appreciated from the forgoing discussion. The foregoing discussion is applicable to machines that are operated to move material according to a material movement plan. Although applicable to any type of machine and material movement plan, the system may be particularly applicable for use with dozers that are used to form a raised contour such as a berm 104 adjacent a high wall 103. The system may be used at a mining site, a landfill, a quarry, a construction site, a roadwork site, or any other area in which movement of material desired.

The system may include a position sensing system 36 associated with a machine such as dozer 12 for determining a position of the machine at the work site 100. The system may further include a work implement such as blade 20 associated with the machine and configured to engage material at the work site 100 to form the raised contour such as berm 104. A controller may be configured to determine a plurality of positions of the machine based upon the position sensing system 36 as the machine moves about the work site 100 and the work implement forms the berm 104. The controller may be further configured to determine a plurality of reference positions along the edge or toe 106 of the berm 104 based upon positions of the machine as the work implement forms the berm and generate a map of the toe of the berm based upon the plurality of reference positions. The controller may be an onboard controller such as dozer controller 41, an offboard controller such as that associated with offboard control system 125, a combination of the two controllers, or some other controller or series of controllers.

With the foregoing system, the additional step of mapping the berm 104 after it has been formed may be eliminated. The disclosed system may thus result in time and cost savings as compared to post-mapping of the berm 104 (i.e., after its formation) with a manual or an automated process. In addition, the use of the disclosed system to generate real-time data points indicative of the position of the berm 104 may permit monitoring of the berm during its formation and permit corrective action, if necessary or desired, before the berm has been entirely formed.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for use with a machine for generating a map of an edge of a raised contour at a work site, comprising:
   a position sensing system associated with the machine for determining a position of the machine;
   a blade associated with the machine and configured to engage material at the work site to form the raised contour;
   an implement load sensor system associated with the machine for measuring a load on the blade; and
   a controller configured to:
      determine a plurality of positions of the machine based upon the position sensing system as the machine moves about the work site and the blade forms the raised contour;
      determine a plurality of reference positions along the edge of the raised contour based upon positions of the machine as the blade forms the raised contour and based upon the implement load sensor system including determining a change in load on the blade; and
      generate a map of the edge of the raised contour based upon the plurality of reference positions.

2. The system of claim 1, wherein the controller is configured to determine each of the plurality of reference positions upon receiving an operator input signal.

3. The system of claim 1, wherein each of the plurality of reference positions is generally at an intersection between a work surface and the raised contour.

4. The system of claim 1, further including a range sensing system associated with the machine for determining a position of the edge of the raised contour and wherein the controller is configured to determine the plurality of reference positions based upon the range sensing system.

5. The system of claim 4, wherein the range sensing system includes a LIDAR system.

6. The system of claim 1, wherein the raised contour is adjacent a crest at the work site and the controller is configured to determine each of the plurality of reference positions along the edge of the raised contour by determining the reduction in load on the blade in conjunction with reversing movement of the machine when the machine is less than a predetermined distance from the crest.

7. The system of claim 1, wherein the controller is configured to interpolate between the plurality of reference positions to generate the map of the edge of the raised contour.

8. The system of claim 1, wherein the raised contour is a berm.

9. A machine comprising:
- a frame;
- a prime mover associated with the frame;
- a position sensing system associated with the machine for determining a position of the machine;
- a blade configured to engage material at a work site to form a raised contour at the work site;
- an implement load sensor system associated with the machine for measuring a load on the blade; and
- a controller configured to:
    - determine a plurality of positions of the machine based upon the position sensing system as the machine moves about the work site and the blade forms the raised contour;
    - determine a plurality of reference positions along an edge of the raised contour based upon positions of the machine as the blade forms the raised contour and based upon the implement load sensor system including determining a change in load on the blade; and
    - generate a map of the edge of the raised contour based upon the plurality of reference positions.

10. The machine of claim 9, wherein the controller is configured to interpolate between the plurality of reference positions to generate the map of the edge of the raised contour.

11. A method for generating a map of an edge of a raised contour at a work site, comprising:
- forming the raised contour with a blade associated with a machine;
- determining a plurality of positions of the machine based upon a position sensing system as the machine moves about the work site and the blade forms the raised contour;
- determining a change in load on the blade based upon an implement load sensor system;
- determining a plurality of reference positions along the edge of the raised contour based upon the plurality of positions of the machine as the blade forms the raised contour and based upon changes in load on the blade; and
- generating a map of the edge of the raised contour based upon the plurality of reference positions.

12. The method of claim 11, further including receiving a plurality of operator input signals and determining one of the plurality of reference positions upon receiving each operator input signal.

13. The method of claim 11, further including determining the plurality of reference positions based upon a remote sensing system.

14. The method of claim 13, wherein the remote sensing system includes a LIDAR system.

15. The method of claim 11, wherein the raised contour is adjacent a crest at the work site and further including determining each of the plurality of reference positions along the edge of the raised contour by determining the reduction in load on the blade in conjunction with reversing movement of the machine when the machine is a less than a predetermined distance from the crest.

16. The method of claim 11, further including interpolating between the plurality of reference positions to generate the map of the edge of the raised contour.

\* \* \* \* \*